Patented July 14, 1942

2,289,548

UNITED STATES PATENT OFFICE 2,289,548

CONDENSATION REACTION

Donald John Loder, Wilmington, Del., assignor to E. I. du Pont de Nemours & Company, Wilmington, Del., a corporation of Delaware No Drawing. Original application October 26, 1935, Serial No. 46,875. Divided and this application January 6, 1939, Serial No. 249,592

5 Claims. (Cl. 260—338)

This invention relates to a new catalyst for organic synthesis and more particularly to boron halide catalysts. The application is a division of U. S. Patent 2,158,031 issued May 16, 1939.

In the Friedel-Crafts reactions for the synthesis of aromatic hydrocarbons, ketones and triphenyl methane derivatives, anhydrous aluminum chloride or an analogous anhydrous halide such as boron fluoride, have been used as the condensing agents. These agents are used in comparatively large proportions as they form, in such reactions, well-defined addition compounds which are in many reactions considered to be the reactive agents. Due to the nature of the materials, the reaction is conducted under anhydrous conditions and recovery of the final products usually involves treatment of the reaction mixture with ice or ice and water. The aluminum halide and analogous halides are thus hydrated and the involved expensive steps required to reconvert them to the anhydrous form generally renders syntheses of this nature commercially unattractive.

An object of the present invention is to provide a new class of condensing or catalytic agents prepared from boron-halogen containing compounds. A further object of the invention is to provide a new and improved class of condensing agents particularly for reactions requiring an acid type condensing agent, such, for example, as: the interaction of olefines and carbon monoxide to produce acids and esters, the interaction of organic acids with olefines to provide high molecular weight esters, and many of the reactions of the Friedel-Crafts type. A still further object of the invention is to provide hydrated boron halide catalysts for accelerating organic reactions of the above types. Other objects and advantages of the invention will hereinafter appear.

I have found that organic reactions such as the preparation of organic acids and their esters by the interaction of carbon monoxide with olefines and reactants which decompose to form such compounds, as well as the Friedel-Crafts type of reactions in which water is not detrimental, can be catalyzed with certain hydrated boron trihalides. These catalysts are particularly effective in reactions requiring superatmospheric pressures. They are also well fitted for catalyzing generally such organic condensation reactions in which water is not detrimental and which require an acidic type catalyst; they are especially adapted for reactions in which an olefine is one of the reactants. A few of the reactions for which these catalysts are suitable include:

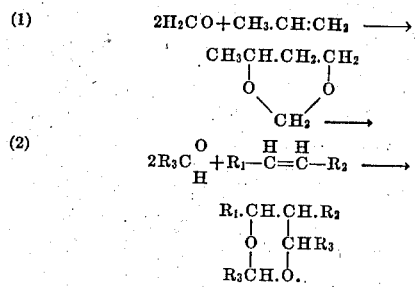

(3)   RCOOH+olefine→ester
(4)   Benzene+olefine→alkyl benzene
(5)   Phenol+olefine→phenol ether and/or substituted phenol
(6)   Phenol+RCOOH→phenyl alkyl ketone In the above reactions R indicates an alkyl, aryl or aralkyl grouping.

My preferred condensing agents for reactions such as those illustrated above and their equivalents are the boron trihalides associated with water in the ratio ranging preferably from one to five moles per mole of boron trihalide. More specifically they include the boron trihalides associated with water as a mono-, di-, tri- and quatri-hydrate of the trifluoride, tribromide, or triiodide of boron. Furthermore, as the boron trihalides form intermediate products which may be designated as intermediate hydrates between those definitely stated above, it is understood that such hydrates are likewise suitable as condensing agents.

It has been stated heretofore that the principal difficulty encountered in the use of anhydrous halides, and more particularly aluminum halide, arose from the necessary destruction of the condensing agent prior to the recovery of the products of the reaction. An additional difficulty in the use of such agents is encountered in handling the anhydrous agents and maintaining them in the anhydrous form. The condensing agents of the present invention can be readily separated by distillation, extraction, decantation or by other means from the reaction products and the recovered agents, generally without the necessity of purification, can be reused directly to accelerate another reaction. The striking advantages of these recoverable highly reactive condensing agents over the anhydrous condensing agents are self evident.

Generally the condensing agents may be prepared by reacting a liquid halogen acid with a boric acid. For example, three moles of liquid hydrofluoric acid may be reacted with one mole of solid orthoboric acid to give the liquid trihydrate of boron trifluoride or one-half a mole of liquid hydrofluoric acid may be reacted with three moles of metaboric acid to give the dihydrate of boron trifluoride.

I shall now describe more specifically methods of preparing the condensing agent of the invention and also processes in which they may be used but it will be understood that the details therein given will not limit the scope of the invention.

*Example 1.*—1696 parts by weight of solid orthoboric acid are placed in a suitable pressure sustaining receptacle and 1643 parts by weight of liquid hydrofluoric acid are added thereto. The temperature of the exothermic reaction is kept at approximately 10° C., and when the reaction of the hydrofluoric acid with the boric acid is complete a liquid, fairly mobile trihydrate of boron trifluoride, having a specific gravity of 1.500 at 20° C., is obtained.

*Example 2.*—468 parts by weight of liquid hydrofluoric acid are combined as in Example 1 with 175 parts by weight of metaboric acid. The liquid catalyst obtained is apparently a dihydrate of boron trifluoride having a specific gravity of 1.625 at 20° C.

As has already been emphasized the condensing agents of the present invention may be utilized in a number of reactions and are most advantageously employed in condensation reactions in which water is not detrimental. I shall now give an example illustrating the type of process in which my preferred condensing agents may be employed, but the utility of the catalysts is not limited by or to the process.

*Example 3.*—Formalin, 172 parts by weight, was caused to absorb 150 parts of boron fluoride gas. The resulting mixture absorbed propylene at from 0° C.–20° C., and one atmosphere pressure, forming a product which, when made alkaline, and distilled, yielded a series of formals. The lower boiling products (distilling at 30° to 123° C.,) were separated by salting out; the material distilling over below 100° C., was purified by redistillation and the boiling point of the chief constituent, butylene glycol cyclic formal, was 113–114.3° C. The higher boiling formals were obtained by continuing the distillation and collecting fractions between 123° and 250° C. Still higher boiling compounds remained in the residue. The yield of the low boiling products, obtained in the salting out process was 56 parts by weight and the yield of products boiling at 123° C. to 250° C., was 15 parts by weight.

My condensing agents may be used in various proportions which are governed by the type of reaction. In the absence of addition agents such as metal oxides or powdered metals, for example, nickel and nickel oxides, they may be used in proportions ranging from 0.25 to 2.0 mol or higher calculated on the boron halide present per mol of the major reactant while in the presence of addition agents much lower amounts may be employed, say, generally, from 1 to 5% and, in some instances, higher percentages may be required. The activity of the addition agent determines in large measure the amount required, the particular reaction as well as the temperature and pressure conditions employed also being considered.

From a consideration of the above specification it will be realized that many changes may be made in the catalysts herein described and the method of their preparation without departing from the invention or sacrificing any of the advantages that may be derived therefrom.

I claim:

1. A process for the preparation of high-boiling formals which comprises reacting a formalin solution with propylene in the presence of hydrated boron fluoride as the catalyst and recovering the formal from the reaction product.

2. A process for the preparation of high-boiling formals which comprises reacting 172 parts of formalin with propylene in the presence of 150 parts of boron trifluoride, at a temperature between 0° C. and 20° C., neutralizing the resulting product and recovering the formals from the neutralized product.

3. A process for the preparation of olefine condensation products which comprises reacting an aldehyde with an olefine in the presence of hydrated boron fluoride as the catalyst and subsequently recovering the condensation product from the reaction mixture.

4. In a process involving the reaction of an olefine with an aldehyde, the step which comprises effecting the reaction between the olefine and the aldehyde in the presence of a liquid water-boron trifluoride catalyst.

5. In a liquid phase process involving the reaction of an olefine with an aldehyde the step which comprises effecting the reaction between the olefine and the aldehyde in the presence of a liquid water-boron trifluoride catalyst containing from 1 to 5 moles of water per mole of boron trifluoride.

DONALD JOHN LODER.